United States Patent [19]

Kunz

[11] Patent Number: 4,460,134
[45] Date of Patent: Jul. 17, 1984

[54] APPARATUS FOR ADJUSTABLY SUPPORTING BEARINGS FOR THE SHAFTS OF REELS OR THE LIKE

[75] Inventor: Udo Kunz, Lörrach, Fed. Rep. of Germany

[73] Assignee: Kunz Maschinen- und Apparatebau GmbH, Lörrach-Hauingen, Fed. Rep. of Germany

[21] Appl. No.: 283,379

[22] Filed: Jul. 15, 1981

[30] Foreign Application Priority Data

Jul. 16, 1980 [DE] Fed. Rep. of Germany ....... 3026904

[51] Int. Cl.³ ........................................... B65H 19/02
[52] U.S. Cl. ................................................. 242/68.4
[58] Field of Search ............... 474/104, 107, 102, 103, 474/105, 106, 108, 109, 123, 126; 384/259, 260, 257, 258; 242/68, 68.4, 68.3, 68.2, 68.1, 76; 308/3 A; 269/58, 59, 60

[56] References Cited

U.S. PATENT DOCUMENTS

| | | | |
|---|---|---|---|
| 2,439,251 | 4/1948 | Hornbostel | 474/104 |
| 2,838,967 | 6/1958 | Meyer | 269/59 |
| 3,124,018 | 3/1964 | Gough | 269/60 |
| 3,331,318 | 7/1967 | Augustyn et al. | 242/68.4 X |
| 3,652,146 | 3/1972 | George | 269/59 X |

FOREIGN PATENT DOCUMENTS

685573 12/1939 Fed. Rep. of Germany .
917592 9/1954 Fed. Rep. of Germany .
154593 5/1932 Switzerland .

*Primary Examiner*—Stuart S. Levy
*Assistant Examiner*—Scott J. Haugland
*Attorney, Agent, or Firm*—Peter K. Kontler

[57] ABSTRACT

An apparatus which can adjust the position of one end portion of a reeling shaft which carries a reel for a web of paper, textile material or the like has a plate-like carrier for a bearing which rotatably mounts one end portion of the shaft, a support for the carrier, and a first slide which is secured to the underside of the carrier and extends into a central chamber of a second slide is movable in a chamber in the support. The first slide can move the second slide in response to rotation of an adjusting shaft which is mounted in the support and extends at right angles to the axis of the reeling shaft. The first slide can move with reference to the second slide in response to rotation of a sleeve having external threads mating with the internal threads of a nut which is affixed to the support. The adjusting shaft is rotatable in but shares all axial movements of the sleeve so that, when the sleeve is rotated, the adjusting shaft moves axially and displaces the first slide through the medium of two collars which are provided thereon and extend into elongated grooves of the first slide. Such grooves extend at right angles to the axis of the adjusting shaft so that the first slide can move at right angles to the axis of the adjusting shaft when the latter rotates a gear in mesh with an elongated rack at the underside of the first slide.

64 Claims, 8 Drawing Figures

APPARATUS FOR ADJUSTABLY SUPPORTING BEARINGS FOR THE SHAFTS OF REELS OR THE LIKE

BACKGROUND OF THE INVENTION

The present invention relates to apparatus for adjustably supporting bearings for the shafts of reels or the like. More particularly, the invention relates to improvements in apparatus for adjustably supporting plates or analogous carriers for the bearings which rotatably mount the end portions of shafts for bobbins or reels. Such apparatus can be used in machines for winding or unwinding webs or paper, synthetic plastic material, textile material, metallic foil or the like.

It is well known that the bearings for the end portions of a shaft which carries a relatively large or even a very small reel or bobbin of convoluted paper or like web or strip material must be capable of adjustment in at least one direction but preferably in several directions in order to ensure that the web will be properly convoluted on or properly paid out by the core of the reel. Accurate alignment of the web with the device which supplies the web to the core (when the latter is rotated in a direction to collect the web) or with the device which draws the web off the core is important for many reasons, e.g., to reduce the likelihood of tearing of the web, to reduce the likelihood of formation of an irregular reel with convolutions which are not in exact register with one another, to avoid unnecessary stressing of bearings for the end portions of the shaft which carries or is integral with the core of the reel, to reduce the wear on bearings and/or guide means of the apparatus, or a combination of such reasons. The adjustments are normally carried out prior to or during the initial stage of the winding or unwinding operation, and the parts of the apparatus thereupon remain in the properly adjusted positions.

It is already known to mount the bearing for one end portion of a shaft, which carries the core of a bobbin or reel, on a plate-like carrier which is adjustable in the axial direction as well as at right angles to the axis of the shaft. As a rule, the carrier is mounted on a first slide or carriage which, in turn, is mounted on a second slide or carriage. The latter is movable along a base plate or the like at right angles to the directions of movement of the first carriage relative to the second carriage. A first moving device is provided to shift the first carriage relative to the second carriage, and a discrete second device is provided to move the second carriage with reference to its support. At least one of such devices is normally installed in axial alignment with the shaft for the reel; this is often undesirable because it unduly increases the space requirements of the apparatus, as considered in the axial direction of the reel, especially if the winding or unwinding machine embodies an adjusting apparatus at each axial end of the reel. Another drawback of the just described conventional apparatus is that their height is considerable because the two carriages are mounted on top of each other, the carrier for the bearing is mounted on top of the first carriage, and the second carriage is mounted on top of its support. It has been found that such conventional apparatus do not allow for convenient access to certain other components which are often utilized in or which constitute essential components of winding or unwinding machines, such as braking devices, means for rotating the shaft for the core (especially if the machine is used to wind a web of paper or the like onto the core), and the friction clutch between the prime mover and an end portion of the shaft for the reel or the like.

The two devices which move the respective carriages of the aforedescribed conventional apparatus are disposed at right angles to each other. This contributes to the space requirements of such apparatus and to complexity of the adjusting operation because one of the devices must be manipulated from one side of the apparatus to adjust the first carriage with reference to the second carriage and the other device must be manipulated from another side of the apparatus to effect an adjustment of the second carriage with reference to its support.

In order to prevent uncontrolled movements of the two carriages in the aforediscussed conventional apparatus with reference to each other, the carriages are often provided with dovetailed guides which establish connections between the two carriages are well as between the second carriage and the support. It has been found that such types of guides often lead to blocking or jamming, especially when a carriage is adjusted in a direction to move the respective end portion of the shaft at right angles to the axis of the shaft. Moreover, jamming is likely to take place in the region of one end portion of the shaft while the other end portion is moved at right angles to the axis of the shaft. Jamming can entail lengthy interruptions of the winding or unwinding operation and/or costly and extensive repairs.

OBJECTS AND SUMMARY OF THE INVENTION

An object of the invention is to provide an adjusting apparatus which can support and change the orientation of bearings for shafts in winding or unwinding machines for webs of paper, textile material or the like and which is simpler, more compact and more versatile than heretofore known apparatus.

Another object of the invention is to provide an apparatus of the above outlined character which can be installed in existing winding or unwinding machines as a superior substitute for presently known bearing-adjusting apparatus.

A further object of the invention is to provide the adjusting apparatus with novel and improved means for moving the bearing with reference to its carrier means.

An additional object of the invention is to provide an apparatus whose height is a small fraction of the height of conventional adjusting apparatus.

Another object of the invention is to provide an apparatus wherein all of the actuating elements are provided at one and the same side of the support for mobile components of the apparatus so that the manipulation of the improved apparatus is simpler and more convenient than that of heretofore known apparatus.

Still another object of the invention is to provide novel and improved means for transmitting motion to the parts which directly or indirectly move the carrier or carriers for the bearing.

A further object of the invention is to provide the apparatus with novel and improved means for reducing the need for frequent inspection, lubrication and/or other maintenance work.

Another object of the invention is to provide the apparatus with novel and improved means for facilitating adjustment of the end portions of a shaft in a winding or unwinding machine with reference to more than two mutually inclined axes.

The invention is embodied in an apparatus for adjustably supporting a bearing, particularly a bearing which is used in a winding or unwinding machine for webs of paper, textile material or the like to mount one end portion of a shaft which carries or forms part of a bobbin or reel for the convoluted material. The apparatus comprises a support (e.g., a horizontal base plate which can be mounted on the floor or on a table in the web processing plant), a bearing-supporting carrier which is movably mounted on the support and may constitute a metallic plate the upper side of which supports (either directly or through the medium or an additional carrier) the bearing for one end portion of the shaft, a first slide which is connected with the carrier, a second slide which is movably connected with the first slide (preferably in such a way that a movement of the first slide in a first direction entails a corresponding movement of the second slide in the same direction and that a movement of the first slide in a second direction at right angles to the first direction can take place while the position of the second slide remains unchanged), and means for moving the first and second slides. The moving means comprises a rotary input element (preferably a single rotary adjusting shaft) on the support and at least one first and at least one second motion transmitting means respectively interposed between the input element and the first and second slides. The first slide may form part of the means which transmits motion from the input element to the second slide. The apparatus preferably further comprises means for releasably holding at least one of the slides in any one of a plurality of selected positions with reference to the support; such holding means can include means for deactivating or arresting one or more components of the first and/or second motion transmitting means each of which may comprise or constitute a suitable coupling device.

The arrangement may be such that the first slide is movable relative to the second slide in the axial direction of the input element (whose axis may be normal to the axis of the shaft for the bobbin or reel) and that the two slides can move as a unit substantially at right angles to the axis of the input element. The motion transmitting means for the first slide can be provided directly on the first slide and on the input element. On the other hand, the motion transmitting means for the second slide can comprise one or more parts which are provided on the first slide and cooperate with one or more parts on the input element, this being the case if the second slide is movable through the medium of the first slide.

The height of the improved apparatus can be held to a minimum by at least partially recessing one of the slides into the other slide and/or by at least partially recessing at least one of the slides into the support.

In accordance with a presently preferred embodiment of the invention, the means for transmitting motion to the second slide includes a gear on the input element, a toothed rack meshing with the gear and secured to the first slide so as to extend at right angles to the axis of the input element, and the first slide. When the input element is rotated (e.g., through the medium of a hand wheel or a crank), the gear moves the rack lengthwise and the rack moves the first slide which, in turn, moves the second slide in a direction at right angles to the axis of the input element.

The means for transmitting motion to the first slide can comprise a nut which is preferably releasably secured to the suppport and meshes with the external threads of a sleeve which rotatably surrounds the input element but is compelled to share all axial movements of the latter (or vice versa). When the sleeve is rotated in the nut (e.g., by way of a second hand wheel), the input element moves axially and thereby moves the first slide relative to the second slide. To this end, the input element preferably comprises one or more collars or like projections partially extending into elongated grooves which are machined into the first slide and extend in parallelism with and flank the aforementioned toothed rack. This enables the first slide to move transversely of the input element when the latter is rotated about its own axis, and the first slide is also movable with the input element when the latter is moved axially in response to rotation of the sleeve.

The just described design of the two motion transmitting means contributes to compactness and simplicity of the moving means for the slides.

In order to ensure that the second slide will invariably share all movements of the first slide in response to rotation of the input element, the second slide is preferably provided with a chamber which receives the first slide (or a portion of the first slide) with requisite clearance for movement of the first slide in the axial direction of the input element. The first slide is then formed with two external surfaces which are preferably disposed at the opposite sides of the input element and each of which abuts against an adjacent internal surface of the second slide. Thus, the first slide can move in the chamber of the second slide but only in one direction (axially of the input element). Any movements which the first slide performs at right angles to the axis of the input element are necessarily shared by the second slide. Jamming or blocking of the first slide in the second slide can be prevented or its likelihood greatly reduced by the simple expedient of providing the first slide with convex external surfaces which abut against the aforementioned internal surfaces of the second slide. Such configuration of external surfaces on the first slide not only prevents jamming of the first slide in the chamber of the second slide but also any other blocking or jamming, including that between the end portion of the shaft and the bearing on the carrier of the improved adjusting apparatus. Also, such mounting reduces the likelihood of jamming in the apparatus for the other end portion of the same shaft if the winding or unwinding machine is equipped with two discrete adjusting apparatus, one for each end portion of the shaft which carries the reel or which forms an integral part of the core of the reel.

The aforementioned sleeve is preferably held against rotation with reference to the nut when the operator rotates the input element to move the first slide with reference to the second slide, and the aforementioned holding means preferably further comprises means for releasably fixing the input element in a selected angular position.

The novel features which are considered as characteristic of the invention are set forth in particular in the appended claims. The improved adjusting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

FIGS. 1 to 6 illustrate a first apparatus which serves to adjust the position of the shaft 3 for a substantially horizontal bobbin or reel 4 carrying or consisting of a convoluted web or strip of paper, textile, synthetic plastic material, metallic foil or the like. The adjusting apparatus comprises a plate-like horizontal carrier 1 which is movable with reference to a stationary base plate or support 6 in directions indicated by double-headed arrows A and B, i.e., in the axial direction of and at right angles to the axis of the shaft 3. The carrier 1 supports a bearing 2 which includes a pivotable or foldable shaft-engaging portion 5 serving to support the shaft 3, namely, the right-hand portion of the shaft 3, as viewed in FIG. 1, 2 or 3 of the drawing. The left-hand portion of the shaft 3 is mounted in a similar bearing 2' which may but need not be adjustable in the same way as the right-hand bearing 2 of FIGS. 1 to 3. The shaft 3 may be rotated in a direction to enable the reel 4 to pay out or to collect the convoluted material, depending on the intended use of the web. The movable portion 5 of each of the bearings 2 and 2' can be disengaged from the respective end portion of the shaft 3 so that the reel 4 can be readily installed in or removed from the adjusting apparatus. The exact construction of the foldable or pivotable portions 5 of the bearings 2 and 2' forms no part of the present invention.

Figure 1:
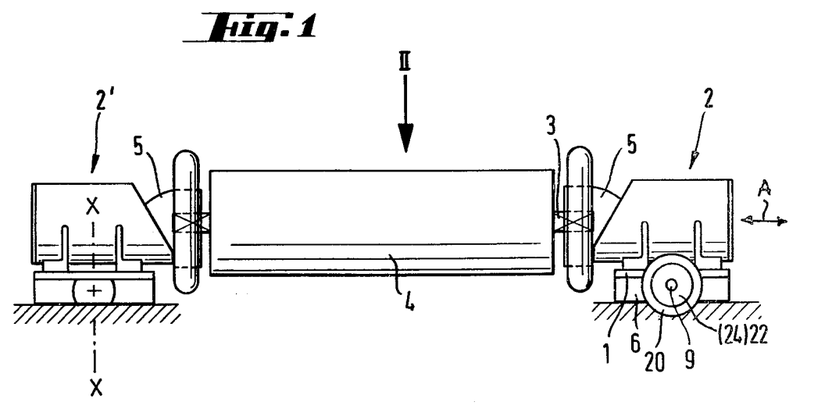
FIG. 1 is a schematic elevational view of an apparatus which embodies one form of the invention and wherein the right-hand carrier is movable in two directions substantially at right angles to each other.
Figure 2:
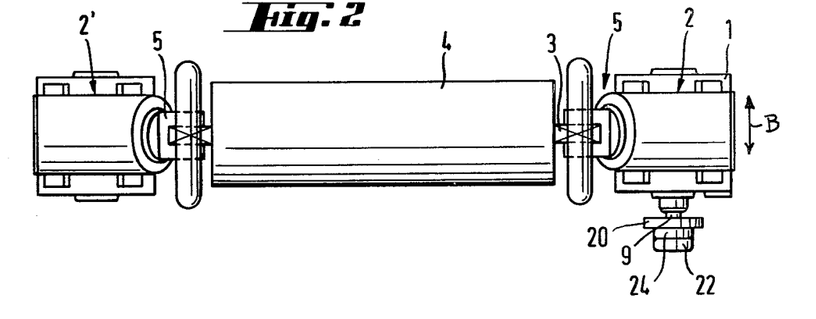
FIG. 2 is a plan view of the structure which is shown in FIG. 1.
Figure 3:
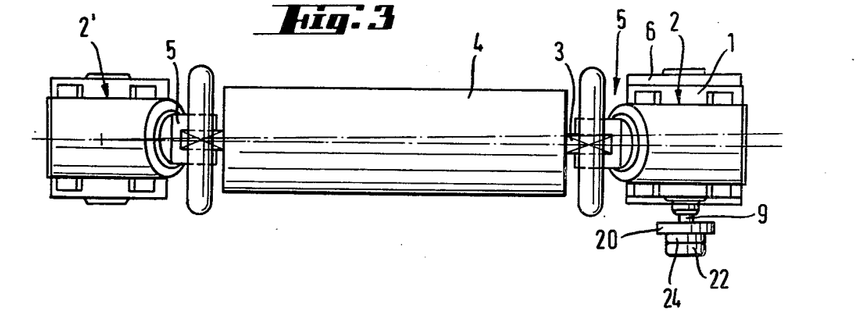
FIG. 3 is a similar plan view but showing the reel in a slightly different orientation as a result of an adjustment of the right-hand carrier with reference to its support.
Figure 5:
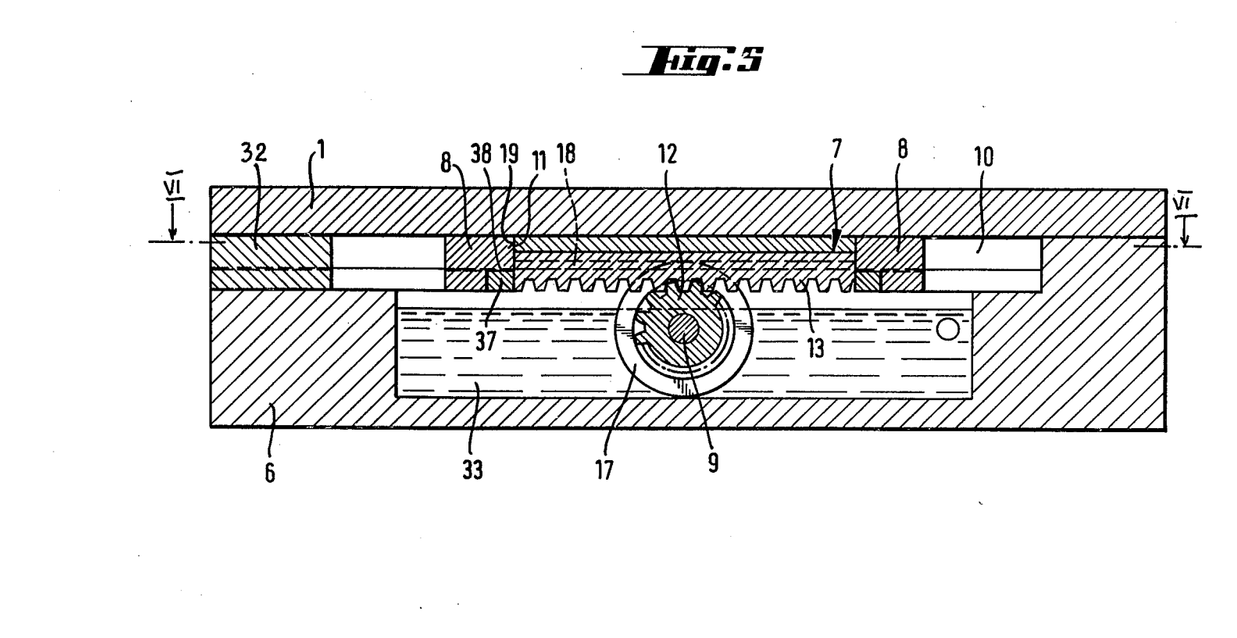
FIG. 5 is a vertical sectional view as seen in the direction of arrows from the line V—V of FIG. 4.

As can be seen in FIG. 5, the underside of the carrier 1 is rigidly connected with a first carriage or slide 7 which, in turn, is at least partly surrounded by and confined in a second carriage or slide 8. The slide 7 is movable with reference to the slide 8, and the slide 8 is movable with reference to the support 6 (with the slide 7 and carrier 1). This enables the person in charge to move the carrier 1 in the direction of the arrow A and/or B by moving the slide 8 relative to the support 6 and/or by moving the slide 7 relative to the slide 8. The slide 7 (with the bearing 2) will be moved in the direction indicated by arrow B when the respective end portion of the shaft 3 is to be moved transversely of its axis, and the slide 8 will be moved relative to the support 6 when the shaft 3 is to be moved axially (arrow A). FIG. 3 shows that the carrier 1 has been moved downwardly, as viewed in the drawing, with reference to the position shown in FIG. 2. Such movement of the carrier 1 is effected by the slide 7 which is caused to move with reference to the slide 8. During such movement of the carrier 1 from the position of FIG. 2 to the position of FIG. 3 (or vice versa), the left-hand bearing 2' of FIGS. 1 to 3 is assumed to turn with reference to or with its carrier about a vertical axis X—X shown in FIG. 1.

Figure 6:
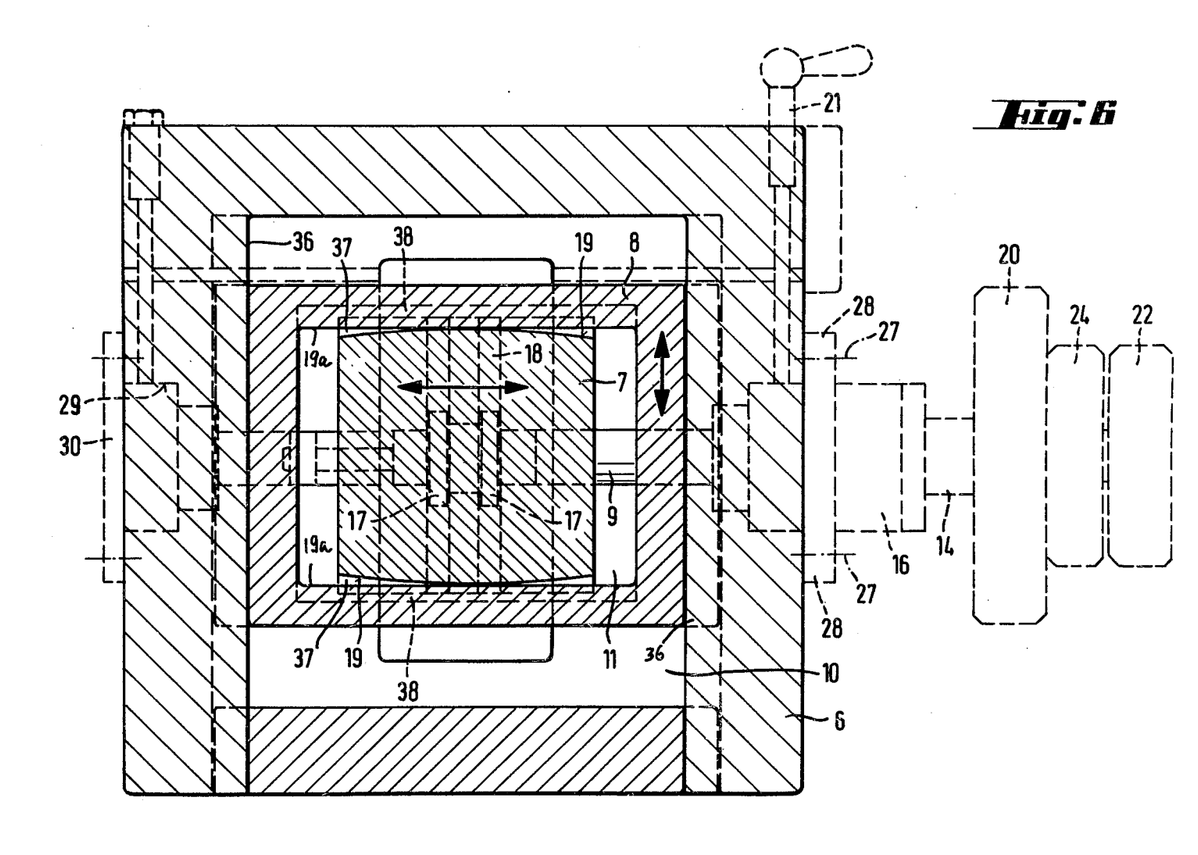
FIG. 6 is a horizontal sectional view as seen in the direction of arrows from the line VI—VI of FIG. 5.

The means for moving the slide 7 with or relative to the slide 8 comprises a rotary and axially movable horizontal input element here shown as an adjusting shaft 9 whose axis is substantially normal to the axis of the shaft 3 and which is mounted in or on the support 6. The moving means further comprises at least two motion transmitting devices, namely, at least one between each of the slides 7, 8 and the adjusting shaft 9, for transmitting motion from the shaft 9 to the selected slide. The shaft 9 can be directly or indirectly coupled with one of the slides (e.g., with the inner slide 7) and indirectly coupled with the other slide. FIG. 6 shows that the slide 7 is at least partially confined in the interior of the slide 8; to this end, the slide 8 has a chamber or compartment 11 for the slide 7. On the other hand, the slide 8 is at least partially confined in the support 6; to this end, the latter is formed with a compartment or chamber 10. FIG. 5 shows that the thickness of the inner slide 7 (as considered at right angles to the general plane of the carrier 1) matches or approximates the thickness of the outer slide 8. The installation of inner slide 7 within the confines of the outer slide 8 contributes to compactness of the improved adjusting apparatus. FIG. 5 further shows that the carrier 1 is relatively thin and is slidably supported by the flat plate-like support 6. This, too, contributes to compactness of the adjusting apparatus. The inner slide 7 is movable within the confines of the chamber 11 in the axial direction of the shaft 9 (arrow B), i.e., substantially at right angles to the axis of the shaft 3 which carries or is integral with the reel 4. The dimensions of the chambers 10 and 11 can be selected with a view to ensure that the surfaces bounding certain portions of such chambers limit the extent of movement of the slide 7 relative to the slide 8 and/or the extent of movement of the slide 8 relative to the support 6.

In the embodiment which is illustrated in FIGS. 1 to 6, the adjusting shaft 9 is rigidly connected with a rotary driving member here shown as a gear 12 (e.g., a relatively small pinion) whose teeth mesh with the teeth of an elongated driven member which is a toothed rack 13 provided at the underside of the inner slide 7. The rack 13 extends substantially at right angles to the axis of the adjusting shaft 9. By rotating the shaft 9, and operator can move the rack 13 lengthwise to thereby shift the plate-like carrier 1 and the bearing 2 on the carrier 1 in the direction of the arrow A. It can be said that the pinion 12 and the associated rack 13 constitute one of the aforementioned motion transmitting or coupling devices, i.e., they can establish a motion transmitting connection between the shaft 9 and the outer slide 8 by way of the inner slide 7.

Figure 4:
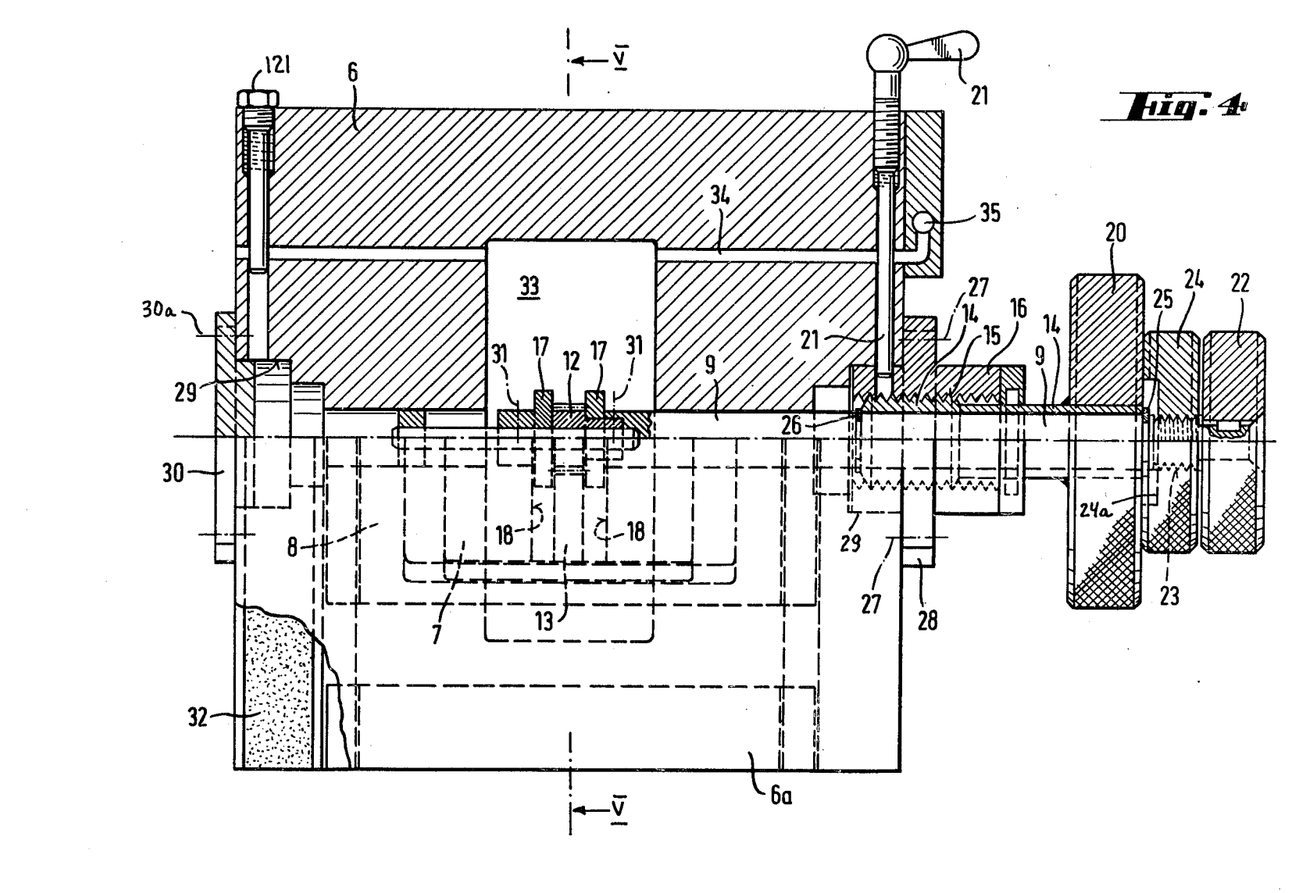
FIG. 4 is an enlarged partly horizontal sectional and partly plan view of the apparatus which adjustably supports the right-hand bearing of FIGS. 1 to 3.

The motion transmitting device between the shaft 9 and the inner slide 7 comprises a tubular element here shown as an elongated threaded sleeve 14 which is rotatable on but cannot move axially of the adjusting shaft 9. The external threads 15 of the sleeve 14 mate with the internal threads of a nut 16 which is mounted on and releasably fixed to the support 6. The apparatus further comprises means for holding, when desired or necessary, the sleeve 14 against rotation with reference to the support 6. As shown in FIGS. 4 to 6, the adjusting shaft 9 is provided with two axially fixed coupling elements in the form of collars or projections 17 which flank the gear 12 and portions of which extend into elongated coupling grooves or ways 18 machined into the underside of the inner slide 7 and extending in parallelism with the toothed rack 13. The collars 17 cooperate with the surfaces bounding the respective grooves 18 to ensure that the slide 7 cannot move in the axial direction of the shaft 9 but is free to move at right angles to such axial direction (arrow A) in response to rotation of the shaft 9 and the resulting lengthwise movement of the toothed rack 13 whose teeth mate with the teeth of the gear 12. However, if the sleeve 14 is rotated with reference to the nut 16, it moves the shaft 9 axially (arrow B), and the collars 17 compel the inner slide 7 to share such axial movement of the shaft 9 with reference to the nut 16 and support 6.

The inner slide 7 has two mirror symmetrical convex external surfaces 19 at the opposite sides of the adjusting shaft 9; these surfaces are in linear contact with the adjacent flat internal surfaces 19a of the outer slide 8. The surfaces 19a bound the corresponding portions of the chamber 11 and ensure that the outer slide 8 is compelled to share all movements of the inner slide 7 which are initiated in response to rotation of the adjusting shaft 9, i.e., in response to rotation of the gear 12 and the resulting movement of the toothed rack 13 in the direction of arrow A. On the other hand, when the adjusting shaft 9 is caused to move axially with the sleeve 14 because the latter rotates relative to the nut 16, the convex surfaces 19 of the slide 7 merely move along the internal surfaces 19a, i.e., the slide 7 and the shaft 9 can move relative to the outer slide 8 to thereby move the bearing 2 in the direction of arrow B. It goew without saying that a single collar 17 and a single groove 18 will often suffice to ensure that the slide 7 is compelled to share all axial movements of the shaft 9 with the sleeve 14. On the other hand, it is equally possible to provide more than two collars and an equal number of grooves 18.

It is also within the purview of the invention to replace the just described motion transmitting means including the gear 12 and toothed rack 13 with coupling means which includes two toothed racks provided on the outer slide 8 and having teeth mating with the teeth of two discrete gears of pinions on the shaft 9. Such toothed racks could be provided at the two sides (i.e., to the right and to the left, as viewed in FIG. 6) of the chamber 11 of the outer slide 8 and would extend at right angles to the axis of the adjusting shaft 9. The illustrated construction is preferred at this time because the motion transmitting means between the shaft 9 and the inner slide 7 can employ a single toothed rack and a single gear on the shaft 9.

The provision of convex external surfaces 19 on the inner slide 7 exhibits several advantages. As shown in FIG. 6, when the inner slide 7 is located substantially midway between the ends of the chamber 11 (as considered in the axial direction of the shaft 9), the central portions of the convex surfaces 19 contact the adjacent central portions of internal surfaces 19a of the outer slide 8. When the inner slide 7 assumes such central or median position, it is in an optimum position for transmission of motion to the outer slide 8 in response to rotation of the shaft 9, i.e., in response to rolling of the gear 12 along the rack 13 which latter is thereby caused to move in the direction of arrow A. Also, the spherical or convex surfaces 19 prevent blocking or jamming of the inner slide 7 in the outer slide 8 when the operator decides to move the right-hand bearing 2 of FIGS. 1 to 3 from the position of FIG. 2 to that shown in FIG. 3 or vice versa. This is due to the fact that the inner slide 7 has freedom of angular movement in the chamber 11 which is in addition to movement in the axial direction of the shaft 9.

FIG. 4 shows that a portion of the sleeve 14 extends from the support 6 and is rigidly connected with an actuating or rotating device in the form of a hand wheel 20. The shaft 9 extends beyond the sleeve 14 and hand wheel 20, i.e., beyond the right-hand end face of the hand wheel 20, as viewed in FIG. 4. By rotating the hand wheel 20, the operator can move the sleeve 14 relative to the nut 16 which is affixed to the support 6 whereby the sleeve 14 moves axially and entrains the shaft 9 which, in turn, moves the inner slide 7 in the direction of the arrow B.

The means for releasably holding the sleeve 14 in a selected angular position comprises a clamping screw 21 which meshes with the support 6 and whose tip can engage the periphery of the sleeve 14 to hold the latter against undesired angular displacement, i.e., to fix the shaft 3 in a selected angular position with reference to the vertical axis X—X. If desired, the holding means may comprise two or more screws 21 or analogous clamping devices. The screw or screws 21 are applied when the operator desires to fix the inner slide 7 against movement in the direction of the arrow B or when the operator desires to hold both slides against any movement relative to the support 6.

That end portion of the shaft 9 which extends beyond the hand wheel 20 is rigidly connected with a second hand wheel 22 which is rotated when the operator wishes to move the carrier 1 in the direction of the arrow A, i.e., at right angles to the axis of the adjusting shaft 9.

The two hand wheels 20 and 22 are separated from each other by a clearance which is traversed by an externally threaded portion 23 of the shaft 9. The external thread of the portion 23 mates with the internal thread of a locking or holding nut 24 which is interposed between the hand wheels 20, 22 and which may constitute a further hand wheel and can be rotated to bear against the adjacent end face of the hand wheel 20 to thus prevent any displacement of the slides 7 and 8 in the direction of the arrow A. Thus, the operator may decide to apply the holding device 21 to the sleeve 14 in a first step and to thereupon cause the locking or holding nut 24 to bear against the hand wheel 20; this ensures that the slides 7 and 8 remain in their selected positions for any desired intervals of time. FIG. 4 shows the locking or holding nut 24 in its left-hand end position of locking engagement with the hand wheel 20. The left-hand end face of the locking nut 24 has a centrally located recess 24a for a preferably elastic split ring 25 which is inserted into a circumferential groove of the shaft 9 and is adjacent to the right-hand end face of the sleeve 14 to thus ensure that the shaft 9 cannot move axially of the sleeve 14 in a direction to the left, as viewed in FIG. 4. The split ring 25 cooperates with a second preferably elastic split ring 26 which is also inserted into a circumferential groove of the shaft 9 and is adjacent to the left-hand end face of the sleeve 14, as viewed in FIG. 4. As explained above, the shaft 9 can rotate with reference to the sleeve 14 (provided, of course, that the nut or hand-wheel 24 is moved away from locking engagement with the hand wheel 20).

FIG. 4 also shows that the left-hand side face of the support 6 is formed with a recess or opening 29 which is normally concealed by a cover or lid 30 detachably secured to the support 6 by screws 30a or analogous fastener means. A similar opening or recess 29 is provided in the right-hand side face of the support 6 and receives a portion of the nut 16, the split ring 26, a portion of the sleeve 14, and a portion of the holding device 21. The two recesses 29 are mirror symmetrical to each other with reference to a plane which is vertical, as viewed in FIG. 4, and halves the support 6. The holding device 21 can be transferred to the left-hand side of the support 6 upon removal of a bolt or screw 121 serving to close the outer end portion of the tapped bore for the externally threaded portion or shank of the device 21.

The aforementioned symmetry plane between the two openings or recesses 29 is normal to the axis of the shaft 9. The nut 16 can be detached from the right-hand side of the support 6 upon removal or loosening of several screws 27 (indicated vby phantom lines) or analogous securing devices which extend through holes provided in a flange 28 of the nut 16 and into tapped bores of the support 6. Upon removal of the cover 30, and upon retraction of the holding device 21, the operator can turn the shaft 9 end-for-end and insert the nut 16 into the left-hand recess 29 of FIG. 4. The flange 28 of the nut 16 is then secured to the respective side of the support 6 by means of fasteners 27 and the cover 30 is applied to the right-hand side of the support 6 to overlie the respective recess 29. The just discussed changing of the position of the shaft 9 can be simplified by providing releasable or separable connections between the shaft 9 on the one hand and the gear 12 and collars 17 on the other hand. Such releasable connections may comprise screws or bolts 31 which are indicated in FIG. 4 by phantom lines. If the parts 12 and 17 are disconnected from the shaft 9 so that the latter can be moved axially (in a direction to the right, as viewed in FIG. 4) while the parts 12 and 17 remain in the illustrated positions, the shaft 9 can be simply extracted from the support 6 and inserted after turning end-for-end. Such inversion of the shaft 9 renders the hand wheels 20, 22, 24 accessible at the upper side of the support 6, as viewed in FIGS. 1, 2 or 3. Moreover, if the left-hand bearing 2' of FIGS. 1 to 3 is also mounted on a mobile plate-like carrier corresponding to the carrier 1, and the mobile left-hand carrier is mounted on a support corresponding to the support 6, the shaft 9 and other parts of the means for moving the plate-like carrier 1 can be used in combination with the left-hand bearing 2'. The aforediscussed design of the support 6 (with two recesses 29) renders it possible to utilize one and the same type of means for moving the one or the other end portion of the shaft 3 in the direction of arrow A and/or B so that such parts of the moving means can be mass-produced at a reasonable cost.

As can be seen in FIG. 5, the upper side or surface of the support 6 is substantially flush with the upper sides or surfaces of the slides 7 and 8. Such upper side or surface of the support 6 is adjacent to the underside of the carrier 1 at both sides of the shaft 9. FIG. 4 shows one of two elongated parallel tracks 32 which extend slightly beyond the upper side or surface of the support 6 and contact the surface at the underside of the carrier 1. The tracks 32 can be recessed into the upper side of the support 6 and may consist of graphite or a synthetic plastic material exhibiting satisfactory self-lubricating properties. The provision of such tracks enhances the facility with which the carrier 1 can be shifted relative to the support 6. It is clear that the tracks 32 or analogous tracks can be applied to or embedded in the underside of the carrier 1 or that such tracks may be provided at the underside of the carrier 1 as well as at the upper side of the support 6. The illustrated tracks 32 flank the outer slide 8 and are spaced apart from each other as considered in the axial direction of the shaft 9.

The support 6 is further provided with two parallel guides 36 for the outer slide 8 (see FIG. 6). Each of the guides 36 can have at least one shoulder or undercut cooperating with a complementary shoulder or undercut of the slide 8. FIG. 5 shows that the slides 7 and 8 have cooperating or complementary guide means in the form of shoulders or undercuts and ribs 37 and 38 to allow for more predictable guidance of the slide 7 by the slide 8.

The median portion of the upper side of the support 6 has a substantially centrally located depression or recess 33 which constitutes a receptacle or sump for a supply of oil, grease or another suitable lubricant. The level of the upper surface of the supply of lubricant in the sump 33 preferably extends above the level of the axis of the shaft 9 so that the gear 12 is properly lubricated at all times and transfers lubricant to the teeth of the rack 13 at the underside of the inner slide 7. The sump 33 constitutes a downward extension of the central portion of the chamber 10 for the outer slide 8. The lubricant in the sump 33 can further contact the collars 17 so that they transfer lubricant to the surfaces bounding the respective grooves 18 at the underside of the inner slide 7. When necessary, the supply of lubricant in the sump 33 can be replenished by way of at least one channel or bore 34 machined into the support 6 and communicating with a lubricant-admitting nipple 35 or the like.

An important advantage of the improved apparatus is that its height (as considered in FIG. 1 or in FIG. 5) is only a small fraction of the height of a conventional apparatus wherein the two slides are installed on top of each other and on top of a support. Moreover, the actuating elements 20, 22 and 24 of the means for moving the shaft 3 relative to the support 6 are readily accessible, simple, inexpensive and occupy a minimal amount of space. These actuating elements are disposed at one side of the support 6 so that each thereof can be readily reached without reaching aroung the support. The adjustments are simple and can be carried out by semi-skilled or unskilled persons. Suitable scales can be provided to enable an operator to ascertain the extent of adjustment of the carrier 1 in the direction of arrow A and/or arrow B. The moving means for the plate-like carrier 1 is extremely simple, compact and easy to manipulate. Thus, all the operator has to do is to rotate the shaft 9 by way of the hand wheel 22 while the sleeve 14 is idle whereby the gear 12 moves the rack 13 which, in turn, moves the carrier 1 and bearing 2 through the medium of the two slides 7 and 8. Alternatively, the operator may rotate the sleeve 14 by way of the hand wheel 20 whereby the shaft 9 moves axially and imparts a corresponding movement to the slide 7 which moves with the carrier 1 and bearing 2 but with reference to the slide 8.

Figure 7:
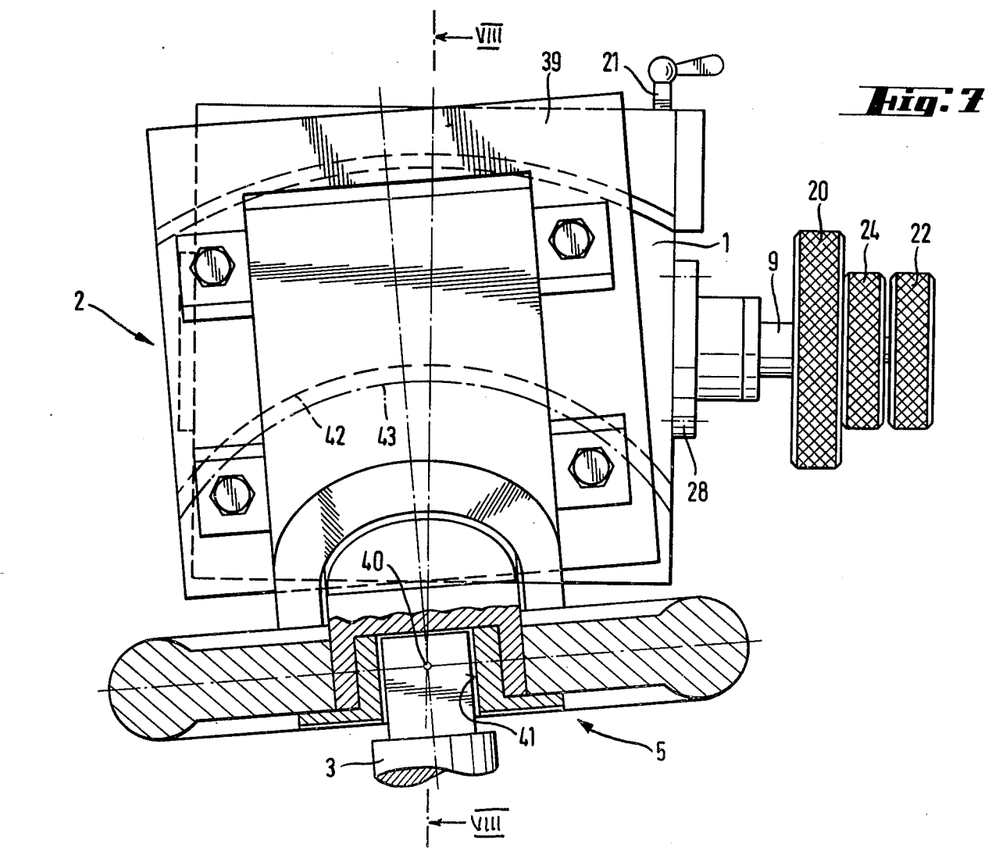
FIG. 7 is a plan view of a modified apparatus with certain parts shown in section.
Figure 8:
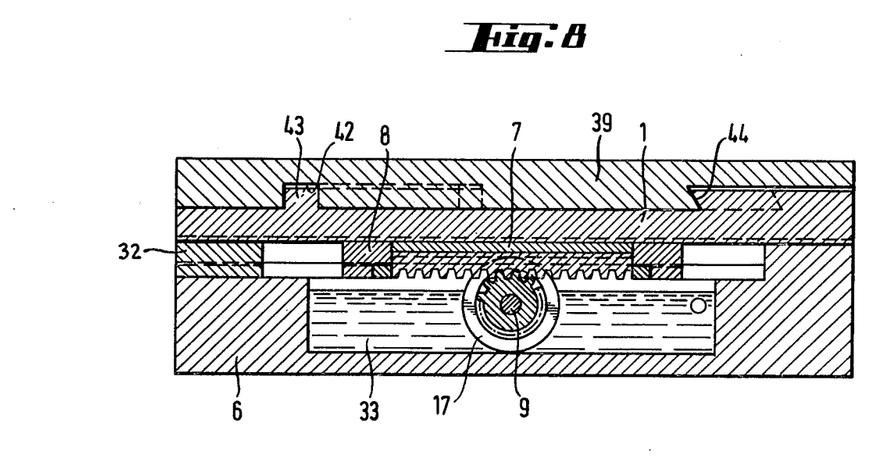
FIG. 8 is a vertical sectional view as seen in the direction of arrows from the line VIII—VIII of FIG. 7.

FIGS. 7 and 8 show a modified apparatus wherein the bearing 2 is further movable about a third axis 40 which is normal to the axis of the shaft 9 and to the general plane of the carrier 1, slide 7, slide 8 or support 6. All such parts which are identical with or clearly analogous to the corresponding parts of the apparatus of FIGS. 1 to 6 are denoted by similar reference characters. With reference to FIG. 7, the third axis 40 is vertical, i.e., it is parallel to the axis X—X shown in the left-hand portion of FIG. 1. The turnability of the bearing 2 about the vertical third axis 40 is attributable to the provision of a second or additional carrier 39 which is a plate-like member mounted on top of the carrier 1. The provision of the additional carrier 39 renders it possible to dispense with convex or other complex external surfaces on the slide 7, i.e., such slide can be provided with flat external surfaces because it need not turn with reference to the slide 8 and the slide 8 need not turn with reference to the support 6. Thus, even though the versatility of the apparatus of FIGS. 7 and 8 exceeds that of the first apparatus, its slides can be of simpler design than those shown in FIGS. 4 to 6.

The axis 40 about which the bearing 2 and the additional carrier 39 can turn relative to the carrier 1 is indicated in FIG. 7 by a dot because such axis is normal to the plane of FIG. 7 and to the axis of the shaft 9. This axis is laterally adjacent to the primary or main carrier 1 (at one side of the shaft 9) and intersects the axis of the shaft 3. Thus, and since the corresponding end portion of the shaft 3 is journalled in the bearing 2 on the additional carrier 39, the axis 40 is adjacent to one axial end of the reel (not shown in FIGS. 7 and 8) which is carried by the shaft 3. The axis 40 does not intersect an imaginary extension of the shaft 3 but rather the axis of the end portion of such shaft (see the lower portion of FIG. 7) which is advisable and advantageous because it enhances the movability of the reel to any one of a practically infinite number of desired positions. The foldable portion 5 of the bearing 2 shown in FIG. 7 has a substantially or exactly square opening 41 for the respective end portion of the shaft 3, and the axis 40 extends through the center of such opening. This is highly desirable, especially if both bearings for the shaft 3 of FIG. 7 are mounted in a manner as illustrated in FIGS. 7 and 8, i.e., for angular movement about vertical axes 40 which intersect the axes of the respective end portions of the shaft 3. The reason for desirability of such design is that the two bearings 2 must be in accurate alinement with each other and the just described construction facilitates such accurate alinement.

The means for turnably mounting the additional carrier 39 on the primary carrier 1 for angular movement about the axis 40 can be constructed and assembled in a number of different ways. FIGS. 7 and 8 show that the underside of the additional carrier 39 has at least one arcuate groove 42 for at least one complementary arcuate tongue or projection 43 at the upper side of the primary carrier 1. It is clear that the positions of the groove 42 and tongue 43 can be reversed or that each of the carriers 1, 39 can be formed with at least one tongue and at least one groove. The centers of curvature of the illustrated groove 42 and tongue 43 are located on the axis 40. Relatively long grooves 42 and tongues 43 are preferred at this time because they enhance the stability of the apparatus and render it possible to transmit substantial forces from the carrier 1 to the carrier 39 and/or vice versa.

The means for connecting the carriers 1 and 39 to each other further comprises means for preventing lifting of the additional carrier 39 above and away from the carrier 1. Such preventing means hold the upper carrier 39 against tilting relative to the lower carrier 1 when the corresponding bearing portion 5 is stressed while the apparatus is in use. In the embodiment of FIGS. 7 and 8, the just discussed preventing means comprises at least one undercut groove (e.g., a substantially dovetailed groove or one-half of a dovetailed groove) 44 in the underside of the upper carrier 39 for a complementary tongue or projection at the upper side of the carrier 1. The radius of curvature of the dovetailed groove 44 is preferably greater than that of the groove 42 but the center of curvature of the groove 44 is also located on the axis 40. This ensures that the surfaces bounding the undercut groove 44 and the complementary tongue are distant from the axis 40 with the result that the lever arm which holds the carrier 39 against lifting above and away from the carrier 1 is relatively long and the just discussed preventing means can offer a pronounced resistance to separation of the two carriers.

The carrier 39 can turn about the axis 40 in response to adjustment of the carrier 1 relative to the base plate or support 6 or independently thereof. The manner in which the slides 7 and 8 of the apparatus shown in FIGS. 7 and 8 are movable with and relative to each other by actuating the handwheel 20 or 22 is the same as described in connection with the apparatus of FIGS. 1 to 6.

The apparatus of FIGS. 7 and 8 exhibits all advantages of the first apparatus plus the additional important advantage that the two bearings at the opposite axial ends of the shaft 3 can be aligned with a very high degree of accuracy. The threads on the sleeve 14 and the teeth on the gear 12 and rack 13 can be readily selected in such a way that the shaft 3 can be adjusted in two or more directions with a very high degree of precision. Continuous lubrication of the gear 12 and collars 17 also contributes to a reduction of the effort which is required to change the position of the carrier 1 and/or 39 relative to the support 6.

The improved apparatus are susceptible of many additional modifications without departing from the spirit of the present invention. For example, if the reel 4 is very heavy or the bearings 2 and 2' must stand pronounced stresses for one or more other reasons, the aforediscussed tracks 32 of graphite or plastic material may be replaced with roller bearings, needle bearings or analogous devices which can readily stand pronounced stresses for extended periods of time and which further reduce the extent of friction between the parts which move relative to each other. Moreover, one can even further reduce or compensate for frictional engagement between the parts that move with reference to each other by providing the apparatus with one or more sealed chambers which confine supplies of oil or another lubricant at properly distributed locations of the apparatus so that the confined supplies of lubricant can properly lubricate the moving parts (and/or the parts which are in contact with moving parts) for extended periods of time and in a highly reproducible manner.

The apparatus can be simplified by reducing the number of parts which guide, couple, otherwise connect and/or support certain elements of the apparatus. All of the parts are readily accessible with little loss in time and by resorting to relatively simple tools so that the inspection, repair or replacement of parts does not take up excessive amounts of time. Bearings of the type shown at 2 and 2' (tilting bearings) in FIGS. 1 to 3 are disclosed, for example, in the German Pat. No. 917,592 granted Aug. 15, 1952.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for adjustably supporting a bearing, particularly a bearing which mounts one end portion of a shaft supporting a reel in a winding or unwinding machine for webs of paper, textile material or the like, comprising:
   (a) a support;
   (b) a bearing;
   (c) a carrier supporting said bearing;
   (d) a first slide on said support connected with and mounting said carrier for movement;
   (e) a second slide movably connected with said first slide, one of said slides being movable with reference to the other of said slides in a first direction, and said other slide being movable with reference to said support in a second direction transverse to said first direction; and
   (f) means for moving said slides, said moving means including an input element, and motion transmitting means interposed between said input element and both of said slides so that said one slide is movable with reference to said other slide in said first direction via said input element and said other slide is movable with reference to said support in said second direction via said input element.

2. The apparatus of claim 1, further comprising means for releasably holding at least one of said slides in any one of a plurality of selected positions with reference to said support.

3. The apparatus of claim 1, wherein at least one of said motion transmitting means comprises a coupling device.

4. The apparatus of claim 1 for adjustably supporting a bearing for one end portion of a shaft having a predetermined axis, wherein one of said directions substantially coincides with and the other of said directions is substantially normal to said predetermined axis.

5. The apparatus of claim 1, wherein one of said slides at least partially surrounds the other of said slides.

6. The apparatus of claim 1, wherein one of said slides has a chamber and at least a portion of the other of said slides extends into and is movable within the confines of said chamber.

7. The apparatus of claim 1, wherein said support has a first chamber and at least a portion of said second slide extends into said chamber with clearance for movement substantially at right angles to the axis of said input element, said second slide having a second chamber, and at least a portion of said first slide extending into said second chamber with clearance for movement in the axial direction of said input element.

8. The apparatus of claim 1, wherein said second slide has a chamber and at least a portion of said first slide extends into said chamber with clearance for movement in the axial direction of said input element, said motion transmitting means comprising a pair of elongated toothed racks flanking said chamber and extending transversely of the axis of said input element, and gears provided on and rotatable with said input element and meshing with said racks so that rotation of said input element entails a movement of said second slide transversely of the axis of said input element.

9. The apparatus of claim 1, wherein one of said motion transmitting means comprises at least one gear, and means for releasably securing said gear to said input element.

10. The apparatus of claim 1, wherein one of said motion transmitting means comprises at least one collar, and means for releasably securing said collar to said input element.

11. The apparatus of claim 1, wherein said second slide has a chamber and at least a portion of said first slide extends into said chamber with clearance for movement in the axial direction of said input element, said support having a sump for a supply of lubricant below said chamber, and said motion transmitting means comprising at least one gear affixed to and rotatable with said input element, at least a portion of said gear dipping into the supply of lubricant in said sump.

12. The apparatus of claim 1, wherein said support has an upper side and said slides have upper sides which are substantially flush with the upper side of said support.

13. The apparatus of claim 1, wherein said first and second directions are substantially normal to one another.

14. The apparatus of claim 1, wherein said input element is a rotary element.

15. The apparatus of claim 1, wherein said input element is mounted on said support.

16. The apparatus of claim 1, wherein said second slide has a chamber and at least a portion of said first slide extends into said chamber with clearance for movement in the axial direction of said input element, said first slide being movable transversely of said input element and having a pair of convex surfaces at the opposite sides of said input element, said second slide having in said chamber a pair of internal surfaces flanking said convex surfaces and each contacting a different one of said convex surfaces so that said second slide is compelled to share all movements of said first slide transversely of said input element.

17. The apparatus of claim 16, wherein said first slide is movable to and from a predetermined position substantially centrally of said chamber, said convex surfaces and said internal surfaces having central portions and the central portion of each convex surface being in contact with the central portion of the respective internal surface in said predetermined position of said first slide.

18. The apparatus of claim 1, wherein said support has a sump for a supply of lubricant and said motion transmitting means comprises a member provided on said input element and dipping into the supply of lubricant in said sump; and further comprising lubricant-admitting means provided in said support and communicating with said sump.

19. The apparatus of claim 18, wherein said lubricant-admitting means comprises at least one channel in said support and a nipple connected with said channel.

20. The apparatus of claim 1, further comprising guide means for said second slide, said guide means comprising complementary elongated guide members provided on said support and said second slide.

21. The apparatus of claim 20, wherein one of said guide members is an undercut projection and the other of said guide members has a groove for said projection.

22. The apparatus of claim 1, further comprising guide means for said first slide, said guide means comprising complementary elongated guide members provided on said first and second slides.

23. The apparatus of claim 22, wherein one of said guide members has an undercut groove and the other of said guide members has a complementary rib extending into said groove.

24. The apparatus of claim 1, wherein said input element includes a rotary adjusting shaft and said motion transmitting means comprises at least one rotary driving member on said adjusting shaft and a driven member provided on one of said slides and reciprocable by said driving member.

25. The apparatus of claim 24, wherein said driving member is a gear and said driven member is an elongated rack mating with said gear and extending at right angles to the axis of said adjusting shaft.

26. The apparatus of claim 25, wherein said rack is provided on said first slide.

27. The apparatus of claim 1, further comprising friction reducing means interposed between said support and said carrier.

28. The apparatus of claim 27, wherein said support has a first surface which constitutes the upper side thereof and said carrier has a second surface which constitutes its underside and is adjacent to said upper side, said friction reducing means comprising a pair of tracks flanking said second slide and secured to said support so as to contact said second surface.

29. The apparatus of claim 27, wherein said friction reducing means consists, at least in part, of self-lubricating material.

30. The apparatus of claim 29, wherein said material includes graphite.

31. The apparatus of claim 29, wherein said material includes a synthetic plastic substance.

32. Apparatus for adjustably supporting a bearing, particularly a bearing which mounts one end portion of a shaft supporting a reel in a winding or unwinding machine for webs of paper, textile material or the like, comprising:
(a) a support;
(b) a bearing;
(c) a first carrier supporting said bearing,
(d) a first slide on said support connected with and mounting said first carrier for movement;
(e) a second slide movably connected with said first slide, one of said slides being movable with reference to the other of said slides in a first direction, and said other slide being movable with reference to said support in a second direction transverse to said first direction;
(f) means for moving said slides, said moving means including an input element, and motion transmitting means interposed between said input element and both of said slides so that each of said slides is movable via said input element; and
(g) a second carrier interposed between said bearing and said first carrier, said second carrier being rotatable with reference to said first carrier about a predetermined axis which is substantially normal to said first and second directions.

33. The apparatus of claim 32, wherein said predetermined axis is substantially vertical.

34. The apparatus of claim 32, wherein said predetermined axis is laterally adjacent to said first carrier.

35. The apparatus of claim 34, wherein the bearing is secured to said second carrier and the end portion of a shaft in said bearing has an axis which is intersected by said predetermined axis.

36. The apparatus of claim 35, wherein the bearing includes a first portion mounted on said second carrier and a second portion supporting the end portion of the shaft and movable with reference to the first bearing portion, said second portion of the bearing having a substantially square opening for the end portion of the shaft, and the center of said opening being located on said predetermined axis.

37. The apparatus of claim 32, further comprising guide means interposed between said carriers, said guide means having an arcuate shape, and the center of curvature of said guide means being located on said predetermined axis.

38. The apparatus of claim 37, wherein said guide means comprises at least one arcuate projection on one of said carriers and a complementary arcuate groove provided in the other carrier and receiving said projection.

39. The apparatus of claim 38, wherein said groove is provided in said second carrier.

40. The apparatus of claim 37, further comprising means for preventing movement of said second carrier away from said first carrier.

41. The apparatus of claim 40, wherein said preventing means comprises an arcuate projection having a substantially dovetailed cross-sectional outline and provided on one of said carriers, and a complementary recess provided in the other of said carriers and receiving said projection.

42. The apparatus of claim 41, wherein the center of curvature of said projection is located on said predetermined axis.

43. The apparatus of claim 42, wherein said guide means comprises at least one arcuate rib provided on one of said carriers, and a complementary groove for said rib, said groove being provided in the other of said carriers, the center of curvature of said rib being located on said predetermined axis, and said rib being nearer to said predetermined axis than said projection.

44. Apparatus for adjustably supporting a bearing, particularly a bearing which mounts one end portion of a shaft for the reel in a winding or unwinding machine for webs of paper, textile material or the like, comprising a support; a bearing-supporting carrier movably mounted on said support; a first slide connected to said carrier; a second slide movably connected with said first slide, one of said slides being movable with reference to the other of said slides in a first direction and said other slide being movable with reference to said support in a second direction substantially at right angles to said first direction; means for moving said slides, including a rotary input element on said support, and at least one first and at least one second motion transmitting means respectively interposed between said input element and said first and second slides, said input element being movable axially and said second slide having a chamber, at least a portion of said first slide extending into said chamber with freedom of movement in the axial direction of said input element, the motion transmitting means between said first slide and said input element comprising a sleeve rotatably surrounding and being movable axially with said input element, a nut fixed to said support and meshing with said sleeve so that rotation of said sleeve relative to said nut entails axial movement of said input element, and means for rotatably coupling said input element to said first slide so that the latter is compelled to share the axial movements of said input element and said sleeve, said sleeve having a portion extending outwardly from said nut; and means for rotating said portion of said sleeve.

45. The apparatus of claim 44, wherein said means for rotating said portion of said sleeve comprises a hand wheel.

46. The apparatus of claim 44, further comprising means for releasably holding said sleeve against rotation with reference to said nut.

47. The apparatus of claim 44, further comprising means for releasably holding said sleeve against rotation with reference to said nut.

48. The apparatus of claim 47, wherein said holding means comprises at least one externally threaded member meshing with said support and having a portion movable into and from engagement with said sleeve.

49. The apparatus of claim 44, wherein said input element has an end portion extending beyond said portion of said sleeve; and further comprising means for rotating said end portion of said input element.

50. The apparatus of claim 49, wherein each of said rotating means comprises a hand wheel.

51. The apparatus of claim 50, wherein said hand wheels are spaced apart from each other, as considered in the axial direction of said input element, and said end portion of said input element is externally threaded intermediate said hand wheels; and further comprising means for releasably holding said input element against rotation with reference to said sleeve, said holding means comprising a locking nut meshing with the end portion of said input element intermediate said hand wheels and rotatable relative to said input element into and from frictional engagement with the hand wheel on said sleeve.

52. The apparatus of claim 51, wherein said locking nut comprises a hand wheel.

53. Apparatus for adjustably supporting a bearing, particularly a bearing which mounts one end portion of a shaft supporting a reel in a winding or unwinding machine for webs of paper, textile material or the like, comprising:
(a) a support;
(b) a bearing;
(c) a carrier supporting said bearing;
(d) a first slide on said support connected with and mounting said carrier for movement;
(e) a second slide movably connected with said firstt slide, one of said slides being movable with reference to the other of said slides in a first direction, and said other slide being movable with reference to said support in a second direction transverse to said first direction; and
(f) means for moving said slides, said moving means including an input element, and motion transmitting means interposed between said input element and both of said slides so that each of said slides is movable via said input element, said input element comprising a rotary adjusting shaft, and said motion transmitting means comprising a nut fixed to said support, and an externally threaded sleeve rotatably surrounding and movable axially with said adjusting shaft, said sleeve meshing with said nut so that rotation of said sleeve with reference to said nut entails axial movement of said adjusting shaft, and said motion transmitting means further comprising means for coupling said adjusting shaft with one of said slides so that such slide shares the axial movements of said adjusting shaft.

54. The apparatus of claim 53, wherein said coupling means comprises at least one groove provided in said one slide and extending substantially transversely of said adjusting shaft, and a projection provided on said adjusting shaft and extending into said groove so that said one slide is movable transversely of said adjusting shaft but is compelled to share all axial movements of said adjusting shaft.

55. The apparatus of claim 54, wherein said motion transmitting means further comprises a gear provided on and rotatable with said adjusting shaft, and a toothed rack provided on said one slide and meshing with said gear, said rack being parallel to said groove so that said one slide is moved transversely of said adjusting shaft in response to rotation of said adjusting shaft about its own axis.

56. Apparatus for adjustably supporting a bearing, particularly a bearing which mounts one end portion of a shaft supporting a reel in a winding or unwinding machine for webs of paper, textile material or the like, comprising:
(a) a support having a first chamber;
(b) a bearing;
(c) a carrier supporting said bearing;
(d) a first slide on said support connected with and mounting said carrier for movement;
(e) a second slide movably connected with said first slide and having a second chamber, one of said slides being movable with reference to the other of said slides in a first direction, and said other slide being movable with reference to said support in a second direction transverse to said first direction; and
(f) means for moving said slides, said moving means including an input element, and motion transmitting means interposed between said input element and both of said slides so that each of said slides is movable via said input element, at least a portion of said second slide extending into said first chamber with clearance for movement substantially at right angles to the axis of said input element, and at least a portion of said first slide extending into said second chamber with clearance for movement in the axial direction of said input element, said first slide having at least one elongated groove extending substantially transversely of said input element, and said input element having a projection extending into said groove so that said first slide is movable substantially at right angles to the axis of said input element.

57. The apparatus of claim 56, wherein said first slide has a pair of first surfaces at the opposite sides of said input element and said second slide has a pair of second surfaces flanking said first surfaces and abutting against the respective first surfaces so that said second slide is compelled to share the movements of said first slide transversely of the axis of said input element.

58. Apparatus for adjustably supporting a bearing, particularly a bearing which mounts one end portion of a shaft supporting a reel in a winding or unwinding machine for webs of paper, textile material or the like, comprising:
- (a) a support;
- (b) a bearing;
- (c) a carrier supporting said bearing;
- (d) a first slide on said support connected with and mounting said carrier for movement;
- (e) a second slide movably connected with said first slide, one of said slides being movable with reference to the other of said slides in a first direction, and said other slide being movable with reference to said support in a second direction transverse to said first direction; and
- (f) means for moving said slides, said moving means including an input element, and motion transmitting means interposed between said input element and both of said slides so that each of said slides is movable via said input element, said motion transmitting means comprising a nut, means for releasably securing said nut to said support, and a sleeve having external threads meshing with said nut, said sleeve being rotatable relative to and being movable axially with said input element, and said support having a first opening for a portion of said nut and a second opening mirror symmetrical to said first opening with reference to a plane which is normal to the axis of said input element, said portion of said nut being insertable into said second opening upon disengagement of said securing means so that said nut can be installed in said support subsequent to inversion end-for-end.

59. The apparatus of claim 58, wherein said sleeve and said input element are detachable from said support together with said nut.

60. Apparatus for adjustably supporting a bearing, particularly a bearing which mounts one end portion of a shaft supporting a reel in a winding or unwinding machine for webs of paper, textile material or the like, comprising:
- (a) a support;
- (b) a bearing;
- (c) a carrier supporting said bearing;
- (d) a first slide on said support connected with and mounting said carrier for movement;
- (e) a second slide movably connected with said first slide, one of said slides being movable with reference to the other of said slides in a first direction, and said other slide being movable with reference to said support in a second direction transverse to said first direction;
- (f) means for moving said slides, said moving means including an input element, and motion transmitting means interposed between said input element and both of said slides so that each of said slides is movable via said input element, said motion transmitting means comprising a nut affixed to said support, and a sleeve rotatably surrounding said input element and having external threads meshing with said nut; and
- (g) means for holding said sleeve against axial movement with reference to said input element and vice versa.

61. The apparatus of claim 68, wherein said holding means compises rings recessed into said input element at the axial ends of said sleeve.

62. Apparatus for adjustably supporting a bearing, particularly a bearing which mounts one end portion of a shaft for the reel in a winding and unwinding machine for webs of paper, textile material or the like, comprising a support; a bearing-supporting carrier movably mounted on said support; a first slide connected to said carrier; a second slide movably connected with said first slide, one of said slides being movable with reference to the other of said slides in a first direction and said other slide being movable with reference to said support in a second direction substantially at right angles to said first direction; and means for moving said slides, including a rotary input element on said support, and at least one first and at least one second motion transmitting means respectively interposed between said input element and said first and second slides, said support having a first chamber and at least a portion of said second slide extending into said first chamber with clearance for movement substantially at right angles to the axis of said input element, said second slide having a second chamber and at least a portion of said first slide extending into said second chamber with clearance for movement in the axial direction of said input element, said first slide having two spaced-apart parallel elongated grooves extending substantially transversely of said input element, and said input element having a pair of projections each of which extends into a different one of said grooves so that said first slide is movable at right angles to the axis of said input element, said first slide further having a pair of first surfaces at the opposite sides of said input element, and said second slide having a pair of second surfaces flanking said first surfaces and abutting against the respective first surfaces so that said second slide is compelled to share the movements of said first slide transversely of the axis of said input element, said projections foming part of the motion transmitting means between said input element and said first slide, the motion transmitting means between said input element and said second slide comprising a gear provided on and rotatable with said input element, and an elongated toothed rack meshing with said gear and disposed intermediate said grooves, said second slide being moved substantially transversely of the axis of said input element through the medium of said first slide in response to rotation of said gear.

63. Apparatus for adjustably supporting a bearing, particularly a bearing which mounts one end portion of a shaft for the reel in a winding or unwinding machine for webs of paper, textile material or the like, comprising a support; a bearing-supporting carrier movably mounted on said support; a first slide connected to said carrier; a second slide movably connected with said first slide, one of said slides being movable with reference to the other of said slides in a first direction and said other slide being movable with reference to said support in a second direction substantially at right angles to said first direction; and means for moving said slides, including a rotary input element on said support, and at least one first and at least one second motion transmitting means respectively interposed between said input element and said first and second slides, said first slide having an underside facing said support and provided with two elongated guide grooves extending transversely of said input element, the motion transmitting means between said first slide and said input element comprising a pair of projections each extending into a different one of said grooves, and said input element being movable axially to thereby move said first slide with reference to said second slide by way of said projections, said second slide being movable transversely of said input element through the medium of said first slide, and the motion transmitting means between said second slide and said input element comprising a gear provided on and rotatable with said input element, and an elongated toothed rack provided at the underside of said first slide intermediate said grooves and meshing with said gear, said rack extending substantially at right angles to the axis of said input element.

64. Apparatus for adjustably supporting a bearing, particularly a bearing which mounts one end portion of a shaft supporting a reel in a winding or unwinding machine for webs of paper, textile material or the like, comprising:
(a) a support;
(b) a bearing;
(c) a carrier supporting said bearing;
(d) a first slide on said support connected with and mounting said carrier for movement;
(e) a second slide movably connected with said first slide, one of said slides being movable with reference to the other of said slides in a first direction, and said other slide being movable with reference to said support in a second direction transverse to said first direction; and
(f) means for moving said slides, said moving means including an input element, and motion transmitting means interposed between said input element and both of said slides so that each of said slides is movable via said input element, said first slide having an underside facing said support and provided with two elongated guide grooves extending transversely of said input element, and said motion transmitting means comprising a pair of projections each extending into a different one of said grooves, said input element being movable axially to thereby move said first slide with reference to said second slide by way of said projections.

* * * * *